United States Patent [19]

Coulter et al.

[11] 3,733,548

[45] May 15, 1973

[54] APPARATUS AND METHOD FOR MEASURING PARTICLE CONCENTRATION OF A SUSPENSION PASSING THROUGH A SENSING ZONE

[75] Inventors: Wallace H. Coulter, Miami Springs; Walter R. Hogg, Miami Lakes, both of Fla.

[73] Assignee: Coulter Electronics, Inc., Hialeah, Fla.

[22] Filed: Apr. 28, 1971

[21] Appl. No.: 138,096

[52] U.S. Cl. ............... 324/71 CP, 328/112, 328/117
[51] Int. Cl. .............................................. G01n 27/00
[58] Field of Search ........................ 324/71, 71 CP; 307/235; 328/115, 116, 117

[56] References Cited

UNITED STATES PATENTS

| | | | |
|---|---|---|---|
| 3,259,842 | 7/1966 | Coulter | 328/117 |
| 3,076,145 | 1/1963 | Copeland | 328/117 |
| 3,444,463 | 5/1969 | Coulter | 324/71 CP |
| 3,441,848 | 4/1969 | Valley | 324/71 CP |
| 3,345,502 | 10/1967 | Berg | 324/71 CP |
| 2,941,144 | 6/1960 | Cannon | 324/71 CP |

Primary Examiner—Stanley T. Krawczewicz
Attorney—Silverman & Cass

[57] ABSTRACT

Apparatus and method for measuring particle concentration in a fluid suspension by obtaining signals from a sensing zone and relating the duration of time occupied by the particles in suspension while traversing the sensing zone to the total time. Concentration is proportional to the percentage of time particles are in the sensing zone.

The apparatus includes means for measuring the duration of a predetermined portion of each particle pulse between two ascertainable points thereof, such as for example, at some fraction of its amplitude and deriving thereby a plurality of duration-measuring pulses. The direct current component of these duration-measuring pulses averaged over the time during which they occurred is obtained in a d.c. meter and is proportional to concentration. The meter indication may be calibrated in terms of concentration.

The apparatus and method are particularly applicable in connection with a Coulter particle analyzing device in which the sensing zone is the aperture of the Coulter device.

26 Claims, 11 Drawing Figures

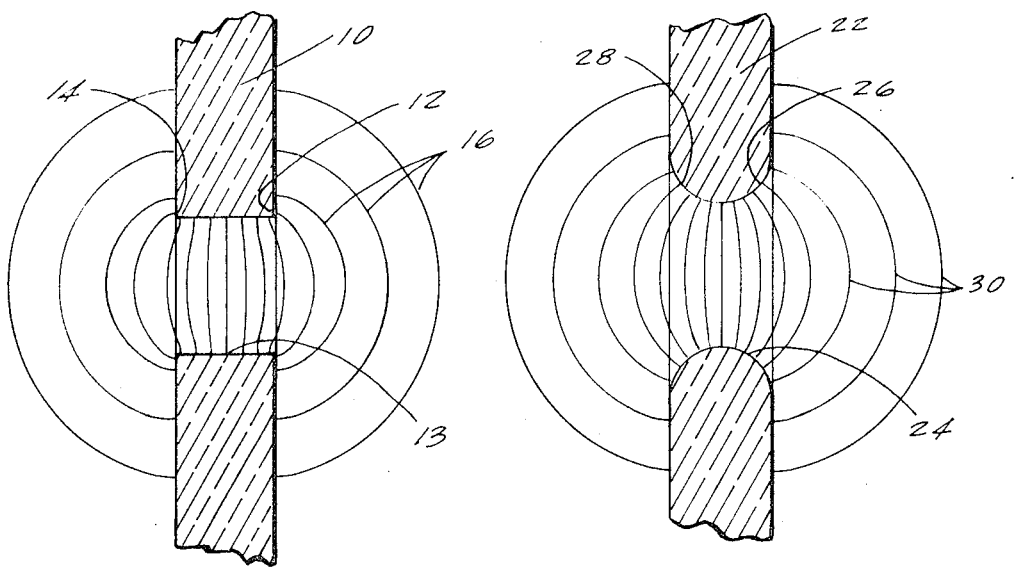
FIG. 1A  FIG. 2A
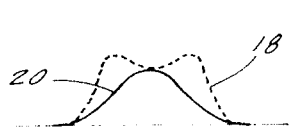  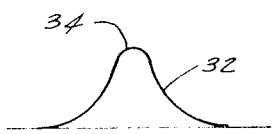
FIG. 1B  FIG. 2B
INVENTORS
WALLACE H. COULTER
WALTER R. HOGG
by Silverman + Cass

APPARATUS AND METHOD FOR MEASURING PARTICLE CONCENTRATION OF A SUSPENSION PASSING THROUGH A SENSING ZONE

BACKGROUND OF THE INVENTION

This invention comprises an improvement upon the method and apparatus described in J.C.Frommer U.S. Pat. No. 2,775,159, The basic teaching of that patent is to the effect that where particles are passing in a fluid medium through a window and being observed by a photo-responsive device, the duty cycle, i.e., the percentage of time that particles are in the window is a measure of the concentration of the particles in the medium. In the patent the particles consisted of dust and the medium was air. As will be seen from the discussion hereinafter, the principle applies equally to a wide variety of particles in fluid media, such as, for example, blood cells in electrolyte, industrial particles in various fluids, etc.

The size of the window of the Frommer structure is required to be small enough so that it will probably be occupied by one particle at a time, but large enough so that the time in which a particle is neither entirely within nor without the window upon entering and leaving is not appreciable.

In structures constructed according to said patent, each time the photo-responsive device sees a particle in the window it produces a signal that is amplified to saturation in a suitable high gain amplifier. The result is a series of pulses all having the same amplitude and each having a duration proportional to the time spent by the particle causing the same while passing through the window. Theoretically, all durations will be the same. The amplifier switches between saturation and cut-off as particles pass through the window and the output is connected into a meter which responds to the unidirectional component of current in such output. The output may be in the form of a voltage or a current depending on the nature of the meter or averaging device which is used. The meter is calibrated to read concentration. Coincidence loss caused by the presence of more than one particle at a time in the window may be compensated for by crowding the scale divisions of the meter at high concentration.

In the Frommer patent, and as would be understood from a study of the geometry involved, the window length must be very much longer than the size of the average particle in order to avoid the problem of lack of definition of the leading and trailing edges of the pulses produced by the particles upon entering and leaving the window. This has been mentioned above. The sharpness of the beginning and end of the particle pulse is less important for very long windows since the relative duration of the beginning and end compared to the overall duration is negligible. Likewise, variations in the duration of pulses due to amplitude differences between pulses which could result in direct application of the pulses to a high gain amplifier become unimportant when the overall duration of each of the pulses is very great.

Large windows are disadvantageous for several reasons. They are not sensitive to smaller particles as are smaller windows, so that the range of particle sizes that can be handled by large windows is low; they give rise to coincidence at much lower concentrations than do smaller windows; they become obstructed easily and are difficult to clear.

From the above, it would seem to follow that although it would be advantageous to use the aperture of a Coulter electronic particle analyzing device (U.S. Pat. No. 2,656,508), the aperture is too small to enable application of the Frommer principle with accuracy. The length of the normal Coulter aperture is of the same order or even less than its diameter. It would also appear that since the particle pulses from a Coulter aperture are quite short and have amplitudes which are proportional to pulse size, merely saturating a high gain amplifier to obtain rectangular signals from such pulses would not produce the desired results. Higher amplitude pulses from larger particles would produce greater duration signals even though their particles occupy substantially the same time in the aperture as the particles producing smaller amplitude pulses. This assumes that the particles have substantially smaller diameter than the length of the aperture, which is practically true in all cases.

A small inspection or sensing zone where the response to passage of a particle is achieved optically can give substantially better results than the Frommer window if the problems described can be overcome.

The advantages of a small inspection zone of either the electronic (Coulter) or optical type can be achieved by using apparatus operating in accordance with the invention herein. The principal stumbling block, namely, the absence of well-defined particle pulse edges, is overcome by circuitry that makes measurements between two ascertainable points on the pulse spaced apart time-wise, such as for example, at some predetermined fraction of the amplitude of the pulses. The geometrical definition for locating these points is applied equally to all pulses. Since in theory the signals from all particles passing through a small sensing zone will have the same average duration, the durations of pulses between two ascertainable points thereof will all be the same. In the case of a Coulter aperture, the only theoretical differences will be in the amplitudes. The durations measured are converted into rectangular signals, all having the same amplitude and their average d.c. component is measured in a suitable output device to give a value that is proportional to concentration.

Errors can arise in measurements made using Coulter apertures whose configurations produce distorted particle pulses. For example, in passing through an aperture with a sharp entrance and/or exit, a particle which does not pass on an axial trajectory may have a skewed formation or multiple or offset peaks. It may also have a duration ostensibly greater than the actual time spent in the aperture by a particle passing on an axial trajectory. The reasons are that the current density in the electrolyte is concentrated at the corners, and the flow adjacent the aperture walls is slower than the flow in the center of the aperture.

Shaping the aperture to avoid corners can decrease the error by eliminating areas of high current density or better yet, by identifying with certainty the exact center of the pulse and making duration measurements with respect to this center. Any proportional duration measurement of pulses will yield the same information on concentration. For the most part, however, since by far the greatest majority of particles pass through the center of the aperture or close to it, the ordinary sharp-edged Coulter aperture will give satisfactory results according to the invention. The errors due to nonaxial trajectories will be the same statistically for all sample suspensions and will affect only the calibration.

As in the case of the Frommer patented structure, the information on concentration which is achieved from this invention is independent of particle size and flow rate. The measurement is made continuously, hence it can also be independent of the time of a given flow, although one form of the invention makes use of a timed measuring cycle to obtain the concentration data using a run-up integrator, which form obviates the reading jitter due to random arrival of the particles in the aperture.

Measurements may be made between many different pairs of points on the particle pulse besides at its fractional amplitude. Several of these are described herein. All ascertainable points are chosen to be in the middle region of the particle pulse where it is well-defined and well above the base line.

SUMMARY OF THE INVENTION

According to the invention, a suspension of particles is passed through an optical sensing zone of very short length or through a Coulter aperture to produce a train of electrical pulses, all having substantially the same duration. In the case of the Coulter aperture, the amplitudes of the particle pulses will be substantially proportional to the sizes of the respective particles which produced them. In the case of the optical sensing zone, the amplitudes of the particle pulses will be proportional to the cross-sectional areas of the respective particles which produced them. The duration of each pulse or a known segment thereof is measured between two ascertainable points of the pulse to derive duration-measuring pulses of constant amplitude. All of these pulses are applied to an averaging device which derives the average duration of all duration-measuring pulses, thus measuring the percentage time occupied by all pulses (or segments thereof) in the aperture. This percentage is proportional to concentration.

In one embodiment, the entire pulse duration at fractional amplitude is measured. In another embodiment, the duration of the pulse from its peak to its half amplitude is measured. In another embodiment, the duration of the pulse between points of inflection is measured by means of circuitry producing the second derivative of the particle pulse.

BRIEF DESCRIPTION OF THE DRAWINGS

FIG. 1A is a diagrammatic sectional view through a Coulter aperture having relatively sharp entrance and exit edges, showing the distribution of equipotential lines through the aperture;

FIG. 1B is a graph illustrating the wave shape of a pulse produced by a particle passing through the aperture of FIG. 1A;

FIG. 2A is a diagrammatic sectional view through a Coulter aperture having relatively rounded entrance and exit edges, showing the distribution of equipotential lines through the aperture;

FIG. 2B is a graph illustrating the wave shape of a pulse produced by a particle passing through the aperture of FIG. 2A;

DESCRIPTION OF THE PREFERRED EMBODIMENTS

Figure 3A:
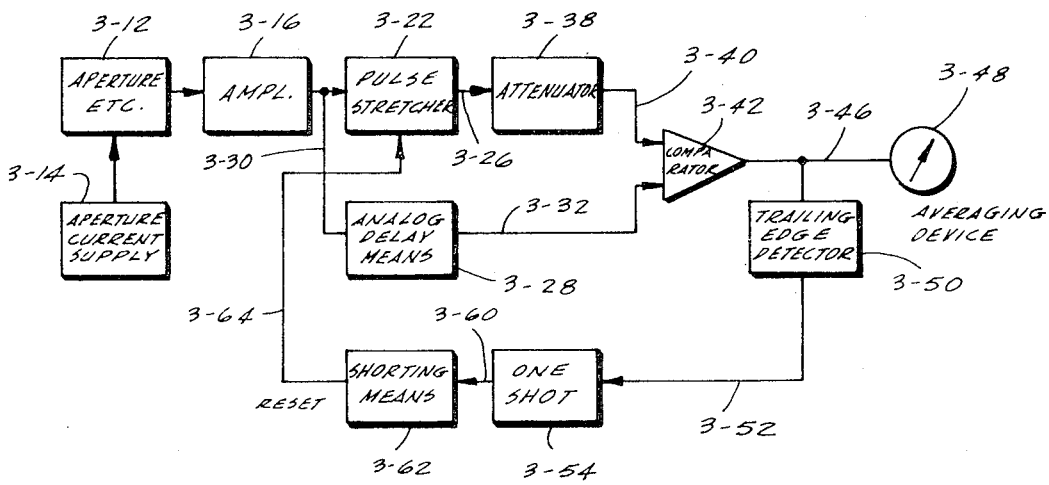
FIG. 3A is a block diagram of a circuit constructed in accordance with the invention for measuring particle concentration by means of a Coulter particle analyzing device, but without counting the particles or making any volume or time measurements.

The invention herein is concerned with the provision of an apparatus and method which enables simplified determinations of particle concentration in fluid mediums using the principles of U.S. Pat. No. 2,775,159. In one aspect, the invention teaches the use of techniques and structure making it possible for the sensing zone, or window as it often is called, to be quite short by using circuitry that establishes the duration between ascertainable points of each electric pulse produced when the ascertainable points are obtained by applying some geometric definition to all pulses. This aspect of the invention is applicable to optical sensing zones, where the particle passes through a narrow beam of some form of radiation thereby interrupting the beam and causing a photosensitive device to produce an electrical signal in response to such passage, and to electronic sensing zones of the type disclosed in U.S. Pat. No. 2,656,508. In the latter type of sensing zone, the zone comprises the aperture of an insulating wafer through which a suspension of particles flows from one body of fluid to another. Simultaneously, there is an electric current flowing through the wafer between the two bodies. The particles change the effective impedance of the liquid which is in the aperture while passing through the same to give rise to the electric signals above-mentioned.

A second aspect of the invention comprises the combination of the teachings of U.S. Pat. Nos. 2,775,159 and 2,656,508. This latter aspect of the invention results in structures more readily constructed and operated with greater accuracy than optical devices. Accordingly, the preferred embodiments are directed to application of the principles of the invention to Coulter type particle analyzing apparatus, but it should be kept in mind that the basic invention can be embodied in and practiced with other types of structures.

Referring now to FIGS. 1A and 2A, the presence of the electric current flowing as described above, in a Coulter aperture establishes an electric field in the aperture 13 of the wafer 10 and at the entrance and exit thereof which may be approximated in a two-dimension graph by equipotential lines as illustrated in said figures. The electric current is normal to these lines and the current density is inversely proportional to the distances between lines.

In FIG. 1A, the wafer 10 is substantially of conventional construction and has the sharp corners 12 and 14 at the entrance and exit of the aperture 13 formed therein. Since equipotential lines 16 are everywhere normal to the surfaces, it can be seen that there is fairly complete parallelism on the center of the aperture and a crowding of the equipotential lines at the corners 12 and 14. Thus, the current density at the corners is much higher than elsewhere and a particle passing through these regions of high current density can have the distorted shape indicated by the broken line graph 18 of FIG. 1B. The pulse produced by a particle passing on an axial trajectory through the center of the aperture 13 will usually have a fairly even wave shape as shown by the solid line graph 20 of FIG. 1B. In both cases, the beginning and end of the respective graphs are not too well defined since the particle, in producing the beginning and end is passing through regions of the field which do not have definite response. In both cases, the center of the graph is fairly well defined, but nonetheless, since most of the pulses which are produced will be more like the pulse 20, it is practical to apply the invention to the use of such pulses for ascertaining concentration. This is done by circuitry such as described in connection with FIGS. 3A and 3B.

In FIG. 2A, the wafer 22 has an aperture 24 therein which has a rounded entrance and exit as indicated at 26 and 28. The equipotential lines are fairly evenly spaced and there are no regions of high current density. Furthermore, the region of highest current density will be in the center of the aperture 24 at the location where the diameter of the electrolyte body is the smallest. The graph of the pulse of a particle passing through the aperture 24 is shown at 32 in FIG. 2B, and while the beginning and end of the pulse is not as well-defined as would be desirable, the peak 34 is quite sharply defined, thus enabling one to use special circuitry for obtaining the duration-measuring pulses which will be described in connection with the apparatus of FIGS. 5A and 5B.

The reason for desiring a well-defined leading and trailing edge for a particle-produced pulse is to establish with some reliability and accuracy the duration of the particle while passing through its optical or electronic sensing zone. The more accurate the establishment of this duration, the more accurate will be the determination of concentration by means of the invention. In the absence of well-defined leading and trailing edges, which is characteristic of pulses produced in all sensing zones, the durations of specific pulse segments are used.

In FIG. 3A, there is illustrated an apparatus 3–10 which is constructed in accordance with the invention to measure the duration of a segment of the particle-produced pulse measured at its half amplitude. Other fractions could be used. At fractional amplitudes, the pulses are more precisely defined than they are at some constant level near their base lines, as would be measured by a simple saturating amplifier.

The blocks 3–12, 3–14 and 3–16 represent a Coulter particle analyzing device. As understood from the discussion, an optical transducing device with an optical sensing zone could be substituted for the Coulter particle analyzing device.

The block 3–12 is the so-called Coulter stand, including the two bodies of electrolyte between which the suspension will be flowing through an aperture, means for causing the liquid flow, the electrodes, glassware, supporting means, etc. The block 3–14 represents the aperture current source which is connected to the electrodes and hence establishes the electric field in the aperture as discussed above. The block 3–16 comprises the amplifier or amplifiers of the Coulter apparatus, and it may be assumed that the terminal 3–18 produces a train of pulses whose amplitudes are essentially proportional to the size of the respect particles passing through the aperture and causing the same, and whose durations are equal to the durations that the respective particles were in the aperture. It may be assumed that the aperture 13 is being used in this case, and the particle pulse produced out of the Coulter apparatus is shown in the graph A of FIG. 3B at 3–20. It occurs at terminal 3–18 between the times $t_1$ and $t_4$, neither the beginning nor the end of the pulse being well-defined.

Figure 3B:
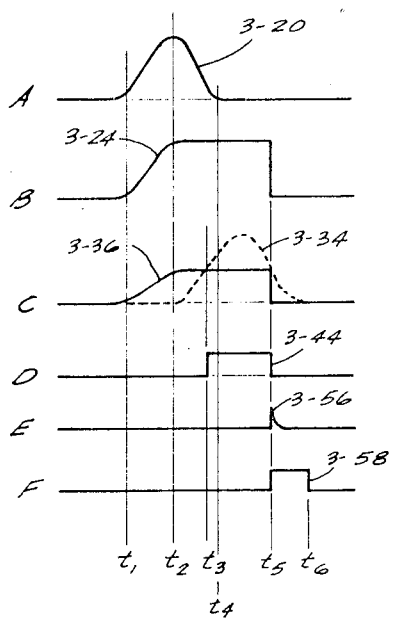
FIG. 3B is a diagram consisting of a series of graphs all on the same time scale illustrating various wave shapes throughout the apparatus of FIG. 3A resulting from the processing of particle pulses therein.

The pulse 3–20 of graph A of FIG. 3B is applied to a pulse-stretcher 3–22 which produces the stretched pulse 3–24 of graph B of FIG. 3B at the line 3–26. The pulse-stretcher may be a diode-capacity circuit which accepts a pulse and follows its leading edge to the maximum amplitude, but which does not subside with the pulse but retains this maximum amplitude until the capacitors in the circuit are discharged. The stretched pulse 3–24 extends from the time $t_1$ to the time $t_5$ which will be discussed hereinafter.

The pulse 3–20 is also applied to the analog delay means 3–28 by way of the line 3–30 and appears at a delayed time on the line 3–32 as shown by the broken line wave shape 3–34 of graph C of FIG. 3B. The same graph shows an attenuated wave 3–36, this being the output of the attenuator 3–38 appearing on the line 3–40. Assuming that there is some loss in the analog delay means 3–28, this is taken into consideration in attenuating the stretched pulse 3–24 to give the exact fraction of the amplitude of the pulse 3–34 at the line 3–40. In this case, the fraction is chosen to be one-half, although it could be any desired fraction. If there is a percentage loss in the delay action, it could be compensated for by an amplifier in the line 3–32 or the attenuation by the attenuator 3–38 could be greater than one-half.

The two lines 3–32 and 3–40 comprise the inputs to the comparator 3–42, and this is indicated by superimposing the wave shapes 3–34 and 3–36 on the same graph C of FIG. 3B. The comparator 3–42 is connected in such a manner that it will produce an output only when the pulse 3–34 exceeds the pulse 3–36. This occurs between the times $t_3$ and $t_5$. It will be seen that the time $t_2$ marks the peak of the particle-produced pulse 3–20 and the location of the start of the plateau of the pulses 3–24 and 3–36, but has no significance in this particular circuit 3–10. The output of the comparator 3–42 consists of the duration-measuring rectangular pulse 3–44 shown in the graph D of FIG. 3B occurring between the times $t_3$ and $t_5$ and appearing on the output line 3–46. The pulses appearing on the line 3–46 are applied to an averaging device 3–48 which conveniently can be a d.c. voltmeter assuming that the pulses 3–44 are voltages.

The meter 3–48 inherently averages the pulses 3–44 over the time that these pulses are being received and hence its armature will assume a position that is indicative of this average, or d.c. component. The position of the pointer carried by the armature is then indicative of the percentage of time occupied by the particles as they pass through the aperture and this is proportional to concentration, according to the teachings of said U.S. Pat. No. 2,775,159.

In choosing a meter for use in the apparatus of FIG. 3A, one would choose one that is fairly well-damped, or one could insert a low-pass filter in the line 3–46 to eliminate fluctuations which could be caused by random arrival of particle-produced pulses.

The termination of the pulse 3–44 is used to reset the pulse stretcher 3–22 since the pulse 3–44 has already been used and there will be no deterioration of the pulse 3–36 to cause problems. The trailing edge of the pulse 3–44 at the time $t_5$ is detected in the detector 3–50 and applied by way of the line 3–52 to the one-shot or univibrator 3–54. The trigger pulse on line 3–52 is shown at 3–56 in graph E of FIG. 3B and the output pulse 3–58 from the one-shot 3–54 appearing on the line 3–60 is shown at times $t_5$–$t_6$ of graph F of FIG. 3B. This pulse 3–58 is applied to the shorting means 3–62 which is connected by the line 3–64 to the pulse stretcher 3–22 and discharges the same to its lowest voltage ready to receive the next pulse 3–20.

The ascertainable points of the pulses such as 3–20 which are processed in the structure of FIG. 3A are geometrically defined as the half amplitude points. The segment of the pulse which is used to measure duration is that occurring between the times $t_3$ and $t_5$.

Figure 4:
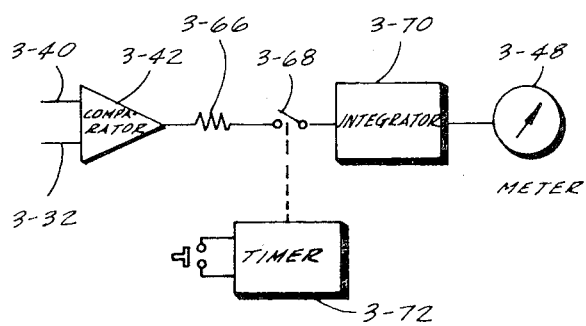
FIG. 4 is a block diagram of a portion of an apparatus quite similar to that of FIG. 3A but in which a run-up integrator is used together with a timer to achieve the desired information.

In FIG. 4, there is illustrated a modified form of the circuit of FIG. 3A showing only the output portion thereof. In this case, the fluctuations due to the arrival of random pulses is totally eliminated by an averaging circuit comprising an integrator and a timing device. The duration-measuring pulses 3–44 from the comparator 3–42 are changed to current by the resistance element 3–66 and pass through the switch 3–68 to be accumulated in an integrator 3–70. The integrator 3–70 charges up while the switch 3–68 is closed and this charge produces a voltage that is read by the meter 3–48. Obviously, the meter indicator continues to rise while the switch is closed. When the switch 3–68 is opened by the timer 3–72, the value read on the meter 3–48 is proportional to concentration. The timer 3–72 is required to close the switch for a predetermined time and this time must be constant for all values of concentration measured.

Figure 5A:
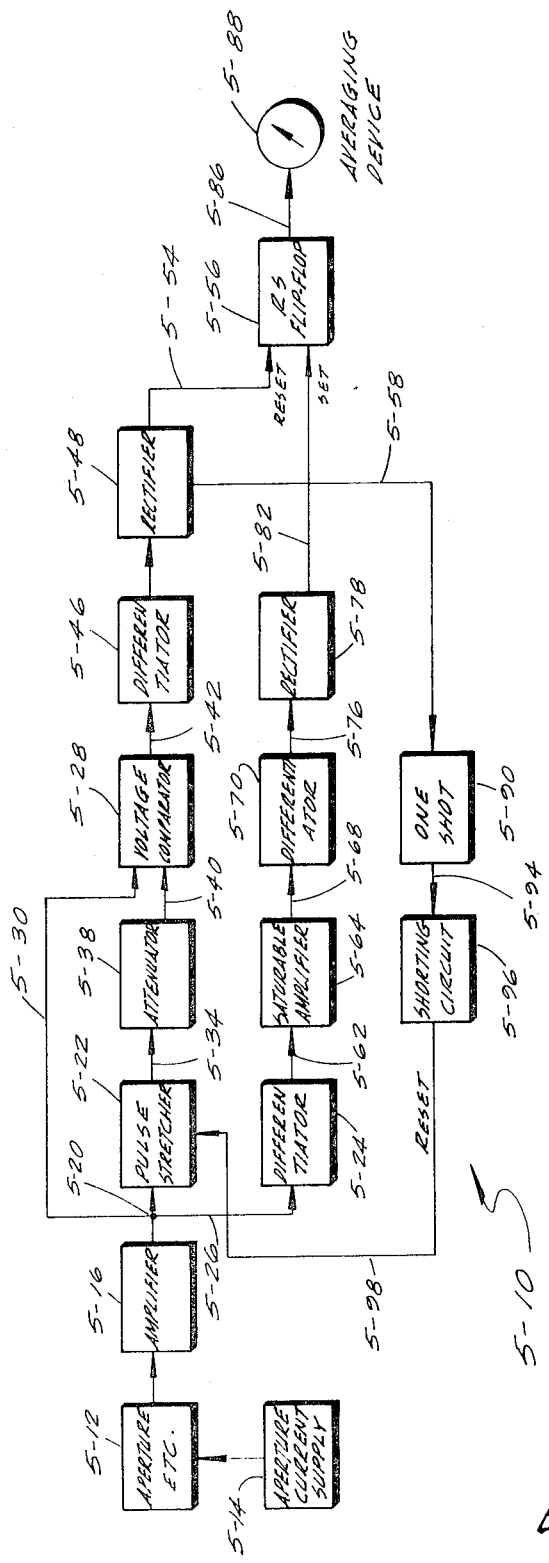
FIG. 5A is a block diagram similar to that of FIG. 3A but illustrating another form of the invention.

The circuit 5–10 of FIG. 5A is a form of the invention which ideally can be used where the peak of the particle-produced pulse is capable of relatively accurate definition. This could come about through the use of an aperture like 24 of FIG. 2A. It could equally be achieved to some extent by constructing an optical sensing zone which comprises an extremely narrow beam of light, such as for example that projected by a monofilament tungsten lamp of very small size. The delay means 3–28 are eliminated and there is no comparison between the attenuated stretched pulse and the particle-produced pulse. Instead, the circuitry is constructed geometrically to define the ascertainable points as the exact instant that the peak occurs and the fractional amplitude of the trailing edge of the particle-produced pulse, respectively. The segment of pulse between these two points defines the duration used in obtaining an average value proportional to concentration.

The Coulter particle analyzing apparatus is the same as in FIG. 3A and is represented by the blocks 5–12, 5–14 and 5–16. An optical transducer could be substituted for the Coulter device. The particles produce the pulses like 5–18 shown in graph A of FIG. 5B at the terminal 5–20. This pulse is applied to the pulse stretcher 5–22, to the differentiator 5–24 by way of the line 5–26 and to one of the inputs of the voltage comparator 5–28 by way of the line 5–30. The output of the pulse stretcher 5–22 is the stretched pulse 5–32 appearing at the line 5–34 between the times $t_1$ and $t_3$ as shown in graph B of FIG. 5B. This pulse is attenuated to, say half the amplitude of the plateau in the attenuator 5–38 and is applied as the pulse 5–36 to the line 5–40 which is the second input to the voltage comparator 5–28. In the voltage comparator 5–28, the pulse 5–18 which is shown by the broken line pulse in Graph C is compared with the attenuated stretched pulse 3–36 and the output on the line 5–42 is the rectangular wave 5–44 of graph D of FIG. 5B. The comparator 5–28 is connected to have no output except for that period of time when the pulse 5–18 on the input line 5–30 exceeds the pulse 5–36 on the input line 5–40. Any fractional amplitude could be used, but must be the same fraction for all pulses in any given circuit.

It is clear from the circuit as thus far described, that the time $t_3$ which represents the point of crossing of the pulse 5–18 on its trailing edge with the plateau of the stretched attenuated pulse 5–36 is fairly well-defined, although the time $t_1$ which is the leading edge of the pulse 5–44 may not be so well-defined. Such point is one of the ascertainable points. The circuit discards all information from the pulse 5–44 except for its trailing edge, and this is detected in the differentiator 5–46 and rectifier 5–48. The differentiator 5–46 produces the positive and negative going spikes 5–50 and 5–52 of graph E of FIG. 5B and the rectifier 5–48 blocks the spike 5–50, leaving the spike 5–52 as a trigger pulse 5–53 on the line 5–54 leading to the reset terminal of the binary flip-flop 5–56. The trigger pulse 5–53 is shown in the graph F of FIG. 5B. It also appears on the line 5–58 for resetting the pulse stretcher 5–22, as will be explained.

Figure 5B:
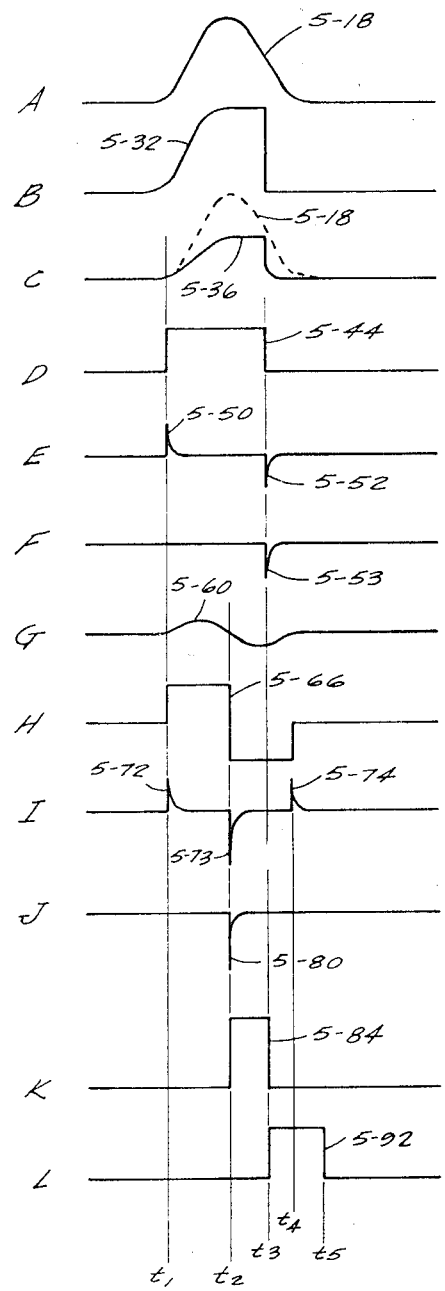
FIG. 5B is a diagram similar to that of FIG. 3B but relating to the apparatus of FIG. 5A.

In the meantime, the pulse 5–18 appearing on the line 5–26 is differentiated in the differentiator 5–24 to provide the output pulse 5–60 at the line 5–62. The differentiated pulse 5–60 shown in graph G of FIG. 5B represents the slope of the pulse 5–18. Such slope is positive on the left side as the leading edge rises, passes through zero at the peak, and is negative on the trailing edge. This differentiated pulse is applied to a saturable amplifier 5–64 which produces a saturated positive going rectangular wave when the input is positive, and a saturated negative going rectangular wave when the input is negative. Such a double rectangular wave is shown at 5–66 in graph H of FIG. 5B and appears at the line 5–68.

Again, the beginning and end of the wave 5–60 may not be too well-defined, so that the boundaries of the double rectangular wave 5–66 at the times $t_1$ and $t_4$ may not be too well-defined either. The important characteristic of the pulse or wave 5–66 is the well-defined center thereof occurring at the time $t_2$ and very accurately defining the peak of the wave 5–18. The wave 5–66 is differentiated in the differentiator 5–70 to give the positive and negative going spikes shown at 5–72, 5–73 and 5–74 of graph I of FIG. 5B and applied by way of the line 5–76 to the rectifier 5–78 where the spikes 5–72 and 5–74 are blocked out. The resulting output trigger pulse 5–80 appears on the line 5–82 as the set input to the RS flip-flop 5–56. This trigger pulse 5–80 is shown in graph J of FIG. 5B. This is the second ascertainable point of the particle pulse 5–18.

Considering the two inputs 5–54 and 5–82 to the RS flip-flop 5–56, a pulse on the line 5–82 sets or turns the flip-flop on, and a pulse on the line 5–54 resets or turns it off. The trigger pulse 5–80 occurs at the time $t_2$ that the pulse 5–18 reaches its peak, while the trigger pulse 5–53 occurs at the time $t_3$ which is the instant that the fractional amplitude of the pulse 5–18 occurs on its trailing edge. The fraction has been chosen and built into the constants of the attenuator 5–38. The output of the RS flip-flop 5–56 will thus become a rectangular wave 5–84 shown in graph K of FIG. 5B, occurring between the times $t_2$ and $t_3$ appearing on the line 5–86 and being the input to the averaging device 5–88.

All pulses appearing at the terminal 5–20 will follow the same criterion, in which the segment of the pulse which is chosen for the derivation of the duration-measuring pulse 5–84 is geometrically defined as peak to fractional amplitude. All pulses will therefore produce the same percentage of duration-measuring pulse, and hence the averaging of these pulses will give the percentage of time that these segments of the pulses were being produced by a particle while it was in the aperture. This percentage is again proportional to concentration, and the meter or averaging device 5–88 may be calibrated to read concentration.

The pulse 5–53 appearing on the line 5–58 triggers the one-shot 5–90 producing the pulse 5–92 of the graph L of FIG. 5B between the times $t_3$ and $t_5$ on the line 5–94 operating the shorting circuit 5–96 to discharge the condensers of the pulse stretcher 5–22 by way of the line 5–98. This readies the circuit 5–10 for the arrival of the next pulse.

The structure of the invention which is illustrated in the block diagram of FIG. 6A and described in connection with the graphs of FIG. 6B obtains as the ascertainable points the first and last points of inflection, that is, maximum slope of the particle pulse. The duration of segments of particle pulses is defined between these points and the direct current component of duration-measuring pulses produced from the measurements is averaged over the time during which they occurred to obtain a signal which is proportional to concentration.

Figure 6A:
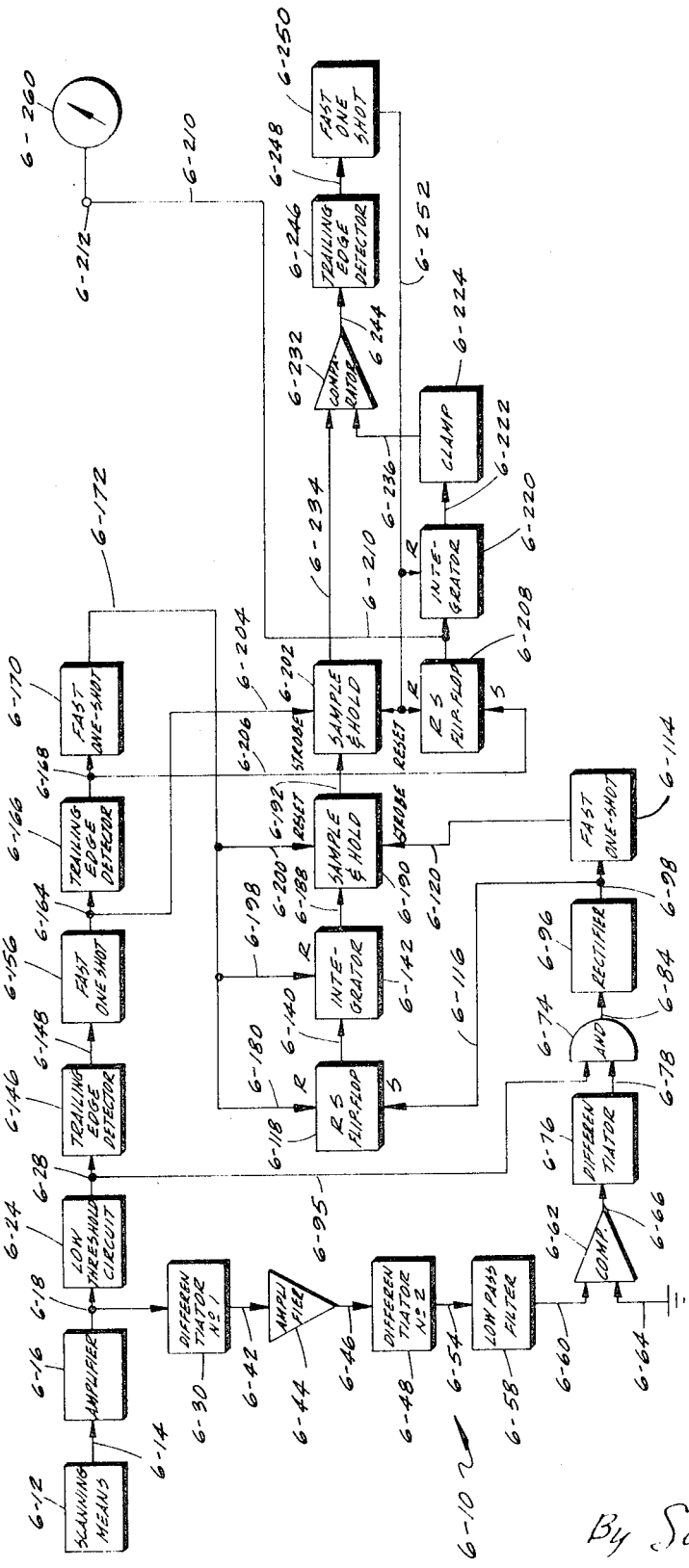
FIG. 6A is a block diagram similar to that of FIG. 3A but illustrating still another form of the invention.

The apparatus constructed to measure the duration of the segments of particle-produced pulses occurring between their respective points of maximum slope is designated 6–10 in FIG. 6A. The scanning means 6–12 may comprise an optical transducer type of apparatus or a Coulter particle analyzing device. If the latter, it will normally include an aperture current supply, an aperture, means for establishing a flow of the sample suspension through the aperture, etc. The particle pulses which are produced at the line 6–14 are amplified in the amplifier 6–16 and appear at the output 6–18 of the amplifier 6–16. Three different types of particle pulses are shown in FIG. 6B at graph A, these being 6–20, 6–21 and 6–22. Pulses 6–20 and 6–22 are produced by single particles following substantially axial paths through a Coulter aperture, whereas the pulse 6–21 may be produced by a combination of multiple particle passages, and/or particles traversing the aperture on nonaxial paths.

Figure 6B:
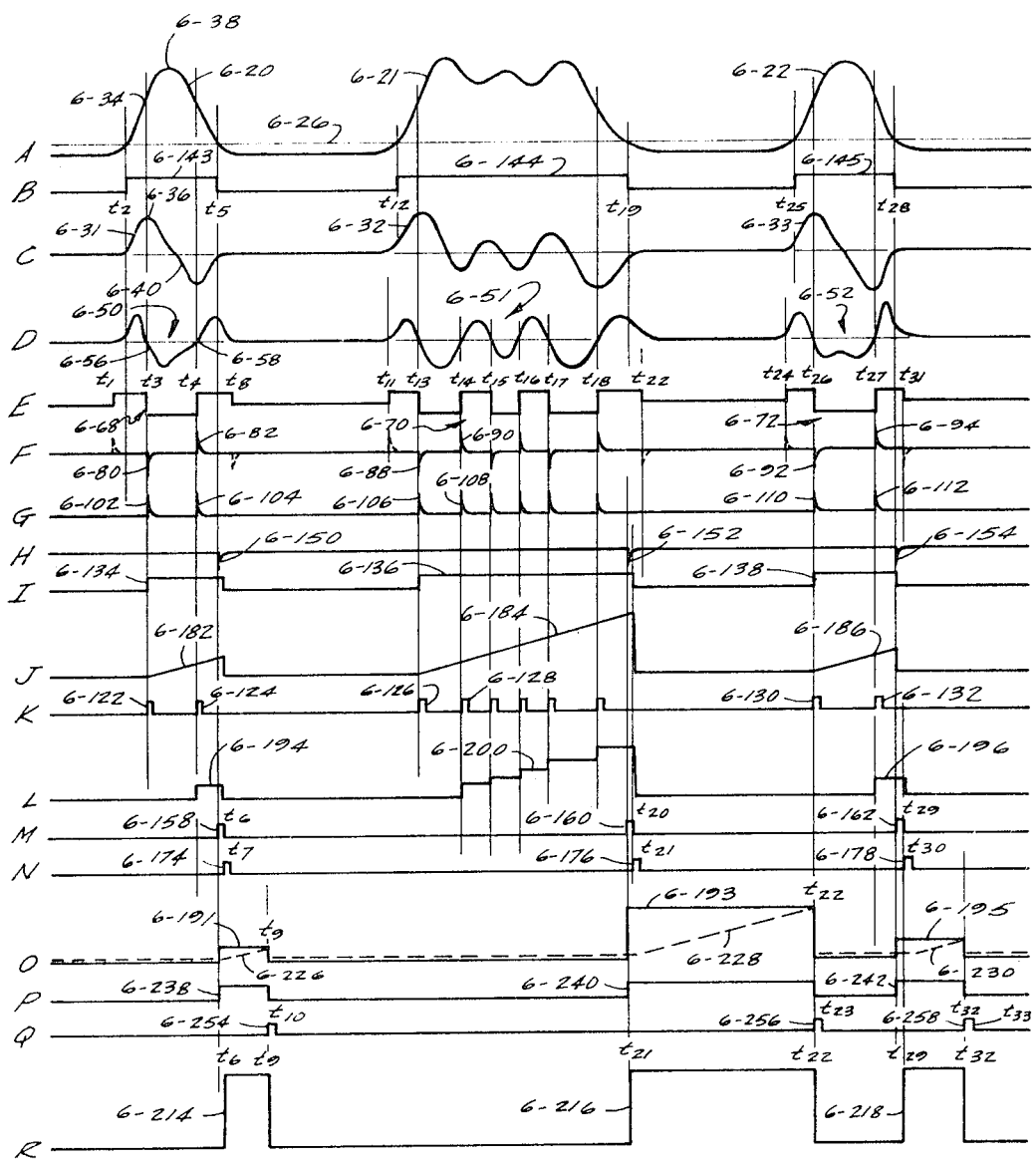
FIG. 6B is a diagram similar to that of FIG. 3B but relating to the apparatus of FIG. 6A.

The pulses at the terminal 6–18 are applied to a low threshold circuit 6–24 whose voltage level is represented at 6–26 in FIG. 6B in the graph A. The output at 6–28 of the low threshold circuit 6–24 consists of rectangular waves shown in graph B of FIG. 6B. The threshold circuit 6–24 is used to prevent the measuring cycle from being initiated by noise and to provide vetoing and triggering pulses as will be described hereinafter.

The particle pulses 6–20, 6–21 and 6–22 are also applied from the terminal 6–18 to a differentiator 6–30 whose output comprises the first differential of each of the pulses as shown in graph C of FIG. 6B. The three first differential signals are 6–31, 6–32 and 6–33. A study of these signals will show that the wave form of each has a maximum amplitude either positive or negative whenever the pulse from which it is derived has a maximum slope. Each signal will have a zero value whenever the pulse from which it is derived has a minimum slope. Thus, for example, the point of inflection or maximum slope of the pulse 6–20 first occurs at about the middle of its leading edge at the time $t_3$ indicated in graph A as 6–34. This produces the peak 6–36 in the graph C of FIG. 6B on the waveform 6–31. The minimum slope of the pulse 6–20 occurs at its peak 6–38 when the slope is changing from positive to negative, and the waveform 6–31 crosses zero at this point as shown at 6–40 in graph C of FIG. 6B. In like manner, each of the pulses 6–20, 6–21 and 6–22 will produce a waveform at the line 6–42 out of the differentiator 6–30 which comprises its first differential. The amplifier 6–44 amplifies these signals to any desired increased amplitudes and the same signals, but amplified appear on the line 6–46 and are applied to a second differentiator 6–48.

Once more the differentiation occurs, but this time the signals 6–31, 6–32 and 6–33 are differentiated so that the output of the differentiator 6–48 is the first derivative of the signals 6–31, 6–32 and 6–33 but is the second derivative of the pulses 6–20, 6–21 and 6–22, respectively. The second derivative signals appear at 6–50, 6–51 and 6–52 in graph D of FIG. 6B. These are on the output line 6–54. The waveform of each signal has a maximum whenever the first derivative has a maximum slope and is zero whenever the first derivative has minimum slope. Accordingly, the signals 6–50, 6–51 and 6–52 will have zero values whenever the slopes of the first derivative signals are respectively zero, and these zero values are crossings of the base line, each representing either a maximum negative or a maximum positive slope of the particle pulses. Thus, in the signal 6–50, the waveform crosses the base line at 6–56 which occurs at the time $t_3$, this being the instant of maximum slope 6–34 of the pulse 6–20 on its leading edge. Another zero crossing 6–58 occurs at the time $t_4$ which represents the inflection point or point of maximum slope on the trailing edge of the pulse 6–20, occurring at the time $t_4$. By the same analysis, it can be understood that the waveform 6–51 crosses the baseline at the times $t_{13}$, $t_{14}$, $t_{15}$, $t_{16}$, $t_{17}$ and $t_{18}$, all of these being points of inflection of the pulse 6–21. The last signal 6–52 likewise has baseline crossing points of $t_{26}$ and $t_{27}$ representing the points of maximum slope on the leading and trailing edges of the pulse 6–22.

Since two differentiators in cascade have a rising transmission versus frequency characteristic of 12 decibels per octave (meaning that the output is quadrupled when the input frequency is doubled), high frequency noise in the part of the spectrum in which there is no signal energy can become very troublesome. In order to obviate this noise without affecting the desired signals, the low pass filter 6–58 is placed at the output 6–54 of the second differentiator 6–48. It is designed to roll off the overall response as fast as possible above the spectrum of the signal. To do this it must have a slope of at least 18 db. per octave for these high frequencies. The signals are not changed, however, being in the pass band of the filter.

The output of the low pass filter 6–58 appearing at 6–60 is applied to one input of the comparator 6–62, the other input of which is grounded at 6–64. The output of the comparator 6–62 at 6–66 is a rectangular wave, having one polarity when the signal at 6–60 is positive and the other polarity when the signal at 6–60 is negative. The result is the series of rectangular waves shown in graph E of FIG. 6B. The signal 6–50 produces the signal 6–68, the signal 6–51 produces the signal 6–70 and the signal 6–52 produces the signal 6–72. The comparator 6–62 being a high gain operational amplifier, there will practically be an output of some kind from it between the signals being discussed, but such output is blocked by the AND gate 6–74 as will be explained.

The output 6–66 of the comparator 6–62 is differentiated in the differentiator 6–76 and applied on the line 6–78 to the AND gate 6–74. The resulting output of the differentiator 6–76 is a series of positive and negative going spikes such as 6–80 and 6–82 in graph F. The signals 6–70 and 6–72 result in similar spikes. Note that there is no spike representing the leading and trailing edges of the waveforms 6–68, 6–70 and 6–72 because these are blocked out in any event by the AND gate 6–74 and do not appear on the path 6–84 which is the output of the AND gate 6–74. The spikes of the differentiated waveform 6–70 are such as 6–88 and 6–90. The spikes of the differentiated waveform 6–72 are 6–92 and 6–94.

The AND gate is open to permit passage of signal when there is a signal on line 6–95 and this occurs only during the times that the particle pulses 6–20, 6–21 and 6–22 exceed the threshold 6–26. Accordingly, signals at times $t_1$, $t_8$, $t_{11}$, $t_{22}$, $t_{24}$ and $t_{31}$ cannot get through. The spikes of graph F of FIG. 6B are rectified by the rectifier 6–96 and appear at the line 6–98 as positive-going trigger pulses 6–102, 6–104, 6–106, 6–108, etc. These pulses are applied to the fast one-shot multivibrator 6–114 and by way of the line 6–116 to the "set" input of the RS flip-flop 6–118.

The first spike of each series will set the RS flip-flop 6–118 but each will trigger the fast one-shot 6–114. The output of the fast one-shot 6–114 appears on the line 6–120 and is shown in the graph K of FIG. 6B. The duration of the short pulses 6–122, 6–124, 6–126, 6–128, 6–130, 6–132, etc. is a characteristic of the components of the one-shot 6–114 which are chosen so that the output of the integrator 6–142, to be described, does not have time to change appreciably during one of these short pulses. The RS flip-flop 6–118 is set at the time $t_3$ and produces the output waveform 6–134 of graph I of FIG. 6B. Likewise, the first spike 6–106 and 6–110 of each of the signals 6–70 and 6–72, respectively, will set the RS flip-flop 6–118 to produce the respective output waves 6–136 and 6–138 commencing at the times $6_{13}$ and $t_{26}$. The first spike only of each series will set the RS flip-flop 6–118 and the following ones will be ignored. The waves 6–134, 6–136 and 6–138 appear on the line 6–140 and are applied to the integrator 6–142.

The original particle pulses 6–20, 6–21 and 6–22 recede respectively below the threshold level 6–26 at the times $t_5$, $t_{19}$ and $t_{28}$, respectively. The rectangular waves 6–143, 6–144 and 6–145 commence when the particle pulses exceed the threshold level 6–26 at the times $t_2$, $t_{12}$ and $t_{25}$, respectively. These waves appearing at the line 6–28 are applied to the trailing edge detector 6–146 which is a small capacitor and diode, the resulting output appearing at the line 6–148 and comprising the negative-going spikes 6–150, 6–152 and 6–154 in graph H of FIG. 6B. The spikes are applied to the fast one-shot multivibrator 6–156 to produce the short duration signals 6–158, 6–160 and 6–162 of graph M of FIG. 6B. These latter signals commence at the times $t_5$, $t_{19}$ and $t_{28}$ and terminate at the times $t_6$, $t_{20}$ and $t_{29}$, respectively and appear at the terminal 6–164. The trailing edges of the signals at 6–164 are detected in the trailing edge detector 6–166 and the resulting spikes (not shown) at the terminal 6–168 are used to trigger another fast one-shot 6–170. The output of the fast one-shot 6–170 appears at 6–172 and consists of the very short rectangular pulses 6–174, 6–176 and 6–178 shown in the graph N of FIG. 6B. These pulses commence at $t_6$, $t_{20}$ and $t_{29}$, and terminate at the times $t_7$, $t_{21}$ and $t_{30}$, respectively.

As previously described, the RS flip-flop 6–118 was set on the line 6–116 by the first zero crossing of the baseline of the second derivative of the particle pulses. These sets occurred at the times $t_3, t_{13}$ and $t_{26}$ respectively for the three pulses 6–20, 6–21 and 6–22 respectively. Each setting of the RS flip-flop 6–118 commences the production of a rectangular wave as shown at graph I of FIG. 6B. The output of the fast one-shot 6–170 comprising the fast rectangular pulses 6–174, 6–176 and 6–178 is used to reset the flip-flop 6–118 on the reset line 6–180 which is a continuation of the line 6–172. This occurs slightly later in time than when the respective pulses 6–20, 6–21 and 6–22 recede below the threshold level 6–26. The output from the RS flip-flop 6–118 appearing at 6–140 comprises a rectangular wave which in every case has the same amplitude, but whose duration depends upon the duration of the original particle pulse from which the same is derived. These rectangular pulses are integrated in the integrator 6–142 whose output then comprises a plurality of triangular waves whose eventual amplitudes will depend upon the respective durations of the incoming signals. Thus, the triangular pulses 6–182, 6–184 and 6–186 of graph J of FIG. 6B have amplitudes proportional to the respective durations of the rectangular pulses 6–134, 6–136 and 6–138 which were integrated to produce them. The output of the integrator appears at the line 6–188 and is applied to a sample-and-hold circuit 6–190. The triangular pulses are utilized as duration-measuring pulses.

The sample-and-hold circuit 6–190 receives strobe pulses from the fast one-shot 6–114, these strobe pulses comprising the series of short rectangular pulses 6–122, 6–124, 6–126, etc. appearing on the line 6–120 and shown in graph K of FIG. 6B. Each time that the sample-and-hold circuit 6–190 receives a strobing pulse, its output signal jumps to the instantaneous value of its input signal, which in this case is the output of the integrator 6–142. In the case of the strobing pulses 6–122, 6–124, 6–130 and 6–132, the output of the sample-and-hold circuit at 6–192 will comprise the simple rectangular waves 6–194 and 6–196. In such cases, the input to the sample-and-hold circuit 6–190 is substantially zero when the first strobing pulses 6–122 and 6–130 occur so that there is no output from the circuit 6–190 until the second strobing pulse comes along. Upon this occasion, the resulting wave 6–194 or 6–196 commences by the output from the circuit 6–190 until the second strobing pulse comes along. Upon this occasion, the resulting wave 6–194 or 6–196 commences by the output of the sample-and-hold circuit jumping to the amplitude of the incoming triangular wave at the time of the strobing pulse, then holding this amplitude until the sample-and-hold circuit is reset. This occurs at the same time that the RS flip-flop 6–118 is reset on the line 6–180, and when the integrator 6–142 is reset on the line 6–198. Reset of the sample-and-hold circuit 6–190 occurs over the line 6–200. The reset pulses for all three of these components comprise the short rectangular pulses 6–174, 6–176 and 6–178 of the graph N appearing on the line 6–172.

In the case of the triangular pulse 6–184, there is a series of strobing pulses 6–126, 6–128, etc., caused by the fact that the original particle pulse 6–21 had a complex shape. There was a plurality of zero crossings of the second derivative and hence a plurality of such strobing pulses. The output of the sample-and-hold circuit 6–190 in this case is the staircase signal 6–200 shown in graph L of FIG. 6B. Each level of the staircase signal 6–200 represents the time elapsed from the first second derivative zero-crossing to the most recent, a value which is remembered by the sample-and-hold circuit 6–190 until the next zero-crossing occurs, even of complicated pulses. The measurement consists of the amplitude to which the triangular wave such as 6–182, 6–184 or 6–186 has risen between the first and last zero-crossing of the second derivative of the original particle pulse. The amplitude of the output of the sample-and-hold circuit 6–190 is proportional in each case to the duration between such first and last zero crossings.

When the original particle pulse drops below the threshold level 6–26 at the times $t_5$, $t_{19}$ or $t_{28}$, the trailing edge detector 6–146 triggers the fast one-shot 6–156 which emits a pulse such as 6–158, 6–160 and 6–162 which in each case is used to strobe the second sample-and-hold circuit 6–202 on the path 6–204. This causes the latter sample-and-hold circuit 6–202 to remember the amplitude of the output of the first sample-and-hold circuit 6–190, this latter output being representative of the duration of the particle pulse as defined above. To repeat, this is the duration of the segment of the particle pulse measured from its first point of inflection or maximum slope to its last inflection or point of maximum slope. At the trailing edge of each of the strobing pulses 6–158, 6–160 and 6–162, the fast one-shot 6–170 is triggered, applying rest pulses, as explained, to the RS flip-flop 6–118, the integrator 6–142 and the sample-and-hold circuit 6–190. The output of the second sample-and-hold circuit 6–202 comprises the rectangular pulses 6–191, 6–193 and 6–195 of graph 0.

After the resetting of the various circuits which has been described above between particle pulses, the part of the apparatus 6–10 which converts pulse duration as defined to voltage is ready to receive for processing a following pulse. There is a short period of time after the resetting when further processing of the information derived occurs. This processing may take place simultaneously with the duration-measurement of the following pulse.

The trigger pulse which triggers the fast one-shot 6–170 also appears on the line 6–206 at the times $t_6$, $t_{20}$, and $t_{29}$ and is used to set another RS flip-flop 6–208. The output of this flip-flop 6–208 appears at the line 6–210 and provides the output at the terminal 6–212. It consists of a rectangular pulse for each of the particle pulses 6–20, 6–21 and 6–22. These pulses are 6–214, 6–216 and 6–218, respectively. In each case, the amplitude of the pulse is identical but its duration varies as will be explained.

The output of the flip-flop 6–208 is applied to the integrator 6–220 whose output at 6–222 is applied to a clamp circuit 6–224. The integrator output in each case starts to generate a triangular pulse along the broken lines shown in graph 0. The waveforms are designated 6–226, 6–228 and 6–230. Also shown on the same graph are the output signals from the second sample-and-hold circuit 6–202 occurring at the same time, the latter signals 6–191, 6–193 and 6–195, respectively having the same amplitudes as the maximum amplitude reached by its respective staircase wave of graph L of FIG. 6B. The clamp circuit 6–224 prevents the output of the integrator 6–220 from dropping to ground so that there is no standby condition which puts both inputs to the comparator 6–232 at the baseline. The output of the comparator is either fully up or fully down. The sample-and-hold 6–202 applies its output on the line 6–234 to one input terminal of the comparator 6–232 and the clamp 6–224 applies the output of the integrator, clipped, on the line 6–236 to the other input terminal of the comparator 6–232.

When each of the signals 6–226, 6–228 and 6–230 rises to the amplitude of the respective waves 6–191, 6–193 and 6–195, the output of the comparator 6–232 switches as shown in graph P of FIG. 6B. The resulting signal output from the comparator comprises in each case a rectangular wave 6–238, 6–240 or 6–242. Each of these waves will appear at 6–244 being applied to a trailing edge detector 6–246 whose output 6–248 triggers the fast one-shot 6–250 resulting in the short pulses 6–254, 6–256 and 6–258 appearing at 6–252 and being shown in graph Q of FIG. 6B. This latter pulse in each case will reset the sample-and-hold 6–202, the RS flip-flop 6–208 and the integrator 6–220.

Thus, the voltage level of the sample-and-hold circuits is converted once more into a pulse duration measurement as required in order to have the concentration represented by the duty cycle of a pulse train. In the case that the integrator 6–220 does not have the same time constant as the integrator 6–142, or if their current outputs differ, so that the slopes of the triangular waves of the graph 0 are not the same as those of the graph J, the effect is only a change in calibration. Thus, the integrator 6–220 might be designed to run up as fast as possible consistent with accuracy in order not to utilize excessive time in the processing of a single particle pulse.

The output pulses from the apparatus 6–10 comprising the rectangular pulses 6–214, 6–216 and 6–218 extend in time from the trailing edges of the respective pulses 6–158, 6–160 and 6–162 to the leading edges of the respective reset pulses of graph Q, namely 6–254, 6–256 and 6–258. These times are $t_6$ to $t_9$, $t_{21}$ to $t_{22}$, and $t_{29}$ to $t_{32}$.

The one-shot 6–114 is desirably very fast in order that the voltage at the output of the integrator 6–142 does not have a chance to change appreciably while the sample-and-hold 6–190 is being strobed. Since the latter circuit has to remember this instantaneous voltage for only a few microseconds, it may have a very short memory making it feasible for it to be very fast-acting also.

The output at the terminal 6–212 is connected to some form of averaging device such as a d.c. meter 2–260 which will then be calibrated to read concentration directly.

Considering the circuit 6–10 of FIG. 6A, it is not practical to derive a rectangular pulse directly from the first and last trigger spikes 6–102, 6–104, 6–106, etc. of graph G. Such a procedure, if possible, could certainly eliminate much structure since it would enable the transition from the spikes of graph G to the formation of rectangular waves like those of graph P with little intervening structure. The problem is that to ascertain which of the trigger spikes of graph G is truly the last one requires waiting until the occurrence of the end of the output pulse (graph B) from the threshold circuit 6–24. By the time this occurs, it is too late to make the measurement from the first to last zero crossing since the integrator 6–142 which is making the time measurement would have overrun its mark.

The technique consists in treating each second derivative zero crossing as though it was the last one and remembering the duration until it is certain that the crossing is the one which will truly constitute the last one. At that time, the information may be transferred out of the duration-measuring part of the circuit to be converted back to time.

An alternative solution might be based upon the fact that the last second derivative zero crossing is always due to the negative-going trailing edge of the original particle pulse. The circuit of FIG. 6A could be somewhat simplified by permitting the sample-and-hold circuit 6–190 follow the integrator 6–142 up gradually after a positive slope and remember only after a negative slope. Those skilled in this art will be able to construct such a device in view of the disclosure herein without further explanation.

The embodiments of the invention which have been detailed hereinabove comprise three structures and methods for measuring concentration of particles in a suspension. In each case the basic structure starts with a transducer of optical or electronic character operating on particles passing through a sensing zone and in which particle pulses are produced whose amplitudes are respectively substantially proportional to some geometrical character of the particles which cause the same and whose durations are substantially the durations respectively that the particles were in the sensing zone. The first of these embodiments utilized structure which measured the duration between the ascertainable points on the pulse geometrically defined as the fractional amplitude of the leading and trailing edges. Thus, for example, choosing the fractional amplitude as 50 percent, the two points are halfway up the leading and trailing edges. The second of these embodiments utilized structure in which the duration of a pulse segment was geometrically defined and measured from its peak to a fractional amplitude of its trailing edge. The third embodiment geometrically defined and measured the duration of a segment of a pulse from its point of maximum slope on its leading edge to its point of maximum slope on its trailing edge.

In each of these embodiments, the desirable end sought was to have a signal that represented the duration of an identical segment of each pulse as it passed through the sensing zone so that the duty cycle could be ascertained for all pulses and accumulated to provide a value proportional to concentration but insensitive to particle size or flow rate. The problem primarily sought to be overcome was the inability of prior structures to define the leading and trailing edges of the particle pulses. Such structures were taught by said U.S. Pat. No. 2,775,159.

Instead of the three forms of the invention described above, circuitry can be devised which will geometrically define and measure the following ascertainable points for each pulse:

Measure the pulse from the first zero-crossing of the second derivative, that is, the point of maximum slope of the leading edge to some fractional height of the trailing edge. This method avoids the need for the electronic components required to ascertain the last zero-crossing of the second derivative;

Measure the pulse duration above some voltage corresponding to the mean particle volume or fraction thereof;

Measure the pulse from some fractional height on the leading edge to the peak.

Any readily ascertainable points between which a part of the pulse is geometrically defined and which can be duplicated for each pulse may be used as the basis for measuring duration. The fact that the entire pulse is not used is immaterial, since any segment of every pulse will still give the desired relationship. The d.c. component of such accumulated pulse segments will be proportional to concentration.

With respect to the advent of pulses such as 6–21 that may be caused by coincidence or a nonaxial trajectory of a Coulter aperture by the particle causing the same or both, such pulses will occur as a statistical factor that can be eliminated by proper calibration of the averaging device.

As previously indicated, one of the principal differences between the sensing zone as disclosed in said U.S. Pat. No. 2,775,159 and the sensing zone of this invention lies in the effective length of the zone. In the long zone of the said U.S. Pat. No. 2,775,159, the entry and exit of particles does not affect the results appreciably because the pulse is quite long although other disadvantages accrue. In a short sensing zone such as that of the usual Coulter aperture or that of an extremely narrow optical window the entrance and exit effects of particles passing through the zone are appreciable. The regions of the sensing zone which cause these effects are those in which the particle may be said to be neither entirely within nor entirely without the sensing zone and such regions are large compared with the middle of the zone where the particle may be said to be entirely within the sensing zone. In the case of the sensing zone of U.S. Pat. No. 2,775,159, the opposite is true, namely, the entrance and exit regions are small compared with the middle of the zone.

Since the exit and entrance regions produce indefinite leading and trailing edges on the resulting particle pulses produced by particles passing through the zone, they may be termed regions of indefinite response. The middle of the sensing zone will produce sharp definition of the pulse and this may be termed a region of definite response.

Simple threshold circuits such as 6–24 of FIG. 6A are to no avail in attempting to obtain a measurement of duration of the particle pulse because the duration of pulses adjacent their base lines is materially dependent upon particle geometry. A large particle will commence to produce its particle pulse sooner than a small particle because it affects the indefinite response regions further out from the center of the zone and also will terminate its pulse later. This may be understood by examining the equipotential surfaces of FIGS. 1A and 2A, although surfaces could be included much further out from the center of the aperture truly to represent the field. Thus, the duration of a particle pulse measured close to its base line will not necessarily be independent of size which is desirable in an apparatus of this type.

On account of the above, the ascertainable points referred to herein are those which occur well above the base line, being chosen to fall in the region of the sensing zone where the pulse is well-defined. The several embodiments and methods are based upon different manners of choosing the points, but in each case, the points are chosen on the basis of some geometrical definition which is equally applied to all pulses. In this manner, the invention recognizes the advantages of short sensing zones and teaches how to overcome the disadvantages thereof.

Considerable variation may be made in structures constructed according to the teachings of the invention without departing from the spirit or scope thereof as defined in the appended claims.

What is desired to secure by Letters Patent of the United States is:

1. A method for measuring particle concentration in a fluid suspension of particles, said method including the steps of: passing the particles in said suspension through a sensing zone having regions of indefinite response which regions are large with respect to a region of definite response in the sensing zone; sensing each particle as it passes through the sensing zone; and producing, in response to each particle sensed, an electrical particle pulse which, due to the different response regions in the sensing zone, has no well defined ends but has a well defined middle portion; ascertaining two geometrically defined points on the waveform of each particle pulse in the middle portion of the pulse, the points being spaced apart time-wise; measuring the duration of the segment of each particle pulse defined between the two points; and averaging the durations with respect to time to obtain a signal which is indicative of the concentration of particles in said fluid suspension.

2. The method according to claim 1 wherein said two points are at the same instantaneous amplitude value on the respective leading and trailing edges of each particle pulse, the value at each of the ascertainable points on a given pulse waveform being a predetermined fractional value of the maximum amplitude of that pulse.

3. The method according to claim 2 wherein said step of ascertaining two points on the waveform of each particle pulse includes the steps of simultaneously applying the particle pulse to a delay circuit and to a stretching and attenuating circuit; delaying the pulse in the delay circuit; stretching the pulse at the maximum amplitude of the pulse; attenuating the stretched pulse to some fractional value of the maximum amplitude; comparing the delayed pulse with the stretched and attenuated pulse; generating a first signal when the instantaneous value of the leading edge of the delayed pulse exceeds the amplitude of the stretched and attenuated pulse; and generating a second signal when the instantaneous value of the trailing edge of the delayed pulse falls below the amplitude of the stretched and attenuated pulse.

4. The method according to claim 2 wherein said step of measuring durations of pulse segments includes generating duration-measuring pulses each of which has a duration equal to the time between said two ascertainable points and said step of averaging the durations includes the step of integrating said duration-measuring pulses with respect to time.

5. The method according to claim 1 wherein the two ascertainable points comprise the peak of each particle pulse and a defined point on one of its leading or trailing edges.

6. The method according to claim 5 wherein said defined point is a point on the trailing edge and is at an instantaneous value which is a predetermined fractional value of the maximum amplitude of the pulse.

7. The method according to claim 6 wherein said step of ascertaining two points on the waveform of each particle pulse includes the steps of applying the pulse simultaneously to a differentiating circuit, a comparator, and a pulse stretching and attenuating circuit; differentiating the pulse to ascertain the point of zero slope on the pulse waveform which point is at the peak of the pulse; generating a signal at said point in time when the slope of the pulse waveform is zero; stretching the pulse at the maximum amplitude thereof followed by attenuating the stretched pulse; comparing the stretched and attenuated pulse with the pulse applied directly to the comparator to ascertain when the instantaneous value of the trailing edge of the directly applied particle pulse falls below the amplitude of the stretched and attenuated pulse; and generating a signal at the point in time when the instantaneous value of the trailing edge of the particle pulse falls below the amplitude of the stretched and attenuated pulse.

8. The method according to claim 1 wherein the two ascertainable points on each particle pulse comprise the point of maximum slope on the leading edge of each particle pulse and the point of maximum slope on the trailing edge of each particle pulse.

9. The method according to claim 8 wherein said step of ascertaining two points on the waveform of each particle pulse includes the steps of: simultaneously applying the particle pulse to a low threshold circuit and to a differentiating circuit; producing from the low threshold circuit a first signal having a constant given amplitude so long as the amplitude of the particle pulse is above a given threshold; differentiating the particle pulse twice to obtain a signal which is the second derivative of the particle pulse; comparing the second derivating signal with a common potential; generating respective positive and negative signals of given amplitude when the second derivative signal is positive or negative; differentiating said positive and negative signals of given amplitude to obtain positive and negative signal spikes; applying said first signal and said signal spikes to an AND circuit which passes only those signal spikes occurring during the time the amplitude of the particle is above said given threshold; applying the passed signal spikes to a full wave rectifier to obtain only positive spikes, the first and last of which correspond to the respective points of maximum slope on the leading and trailing edges of the particle pulse; and said step of measuring the duration of each pulse segment includes the steps of: applying said first signal of constant amplitude to a trailing edge detector circuit means which produces signal pulses when the amplitude of the particle pulse falls below said given threshold and said first signal is terminated and goes to zero; applying said positive spikes to a first signal generating circuit which is actuated by the first signal spike it receives; generating a first duration measuring signal which has a constant amplitude, which is initiated by the first positive spike and which is not affected by succeeding positive spikes so long as the amplitude of the particle pulse is above said given threshold and said first signal generating circuit has not received a signal pulse from said trailing edge detector circuit means; integrating said first duration-measuring signal; holding the integral signal in a first sample and hold circuit; applying the positive spikes to said first sample and hold circuit; generating an output signal from said sample and hold circuit each time a positive spike is applied thereto, said output signal having an amplitude equal to the integral of the duration-measuring signal which has been integrated up to that point in time; applying said output signal to a second sample and hold circuit; applying a signal pulse from said trailing edge detector circuit means to said second sample and hold circuit for causing said output signal to be passed through said second sample and hold circuit to a comparator; applying a signal pulse from said trailing edge detector circuit means to a second signal generating circuit to initiate a second duration-measuring signal having a constant amplitude; integrating said second duration-measuring signal; comparing said passed output signal with the developing integral signal of the second duration-measuring signal until said developing integral signal equals the amplitude of said passed output signal; and terminating said second duration-measuring signal when said developing integral signal equals the amplitude of said passed output signal.

10. Apparatus for measuring particle concentration in a fluid suspension of particles, said apparatus comprising: a particle analyzing device having a sensing zone, means for passing the particles in suspension through said sensing zone, means for sensing the presence of the particles within the influence of the zone and for producing in response to each particle sensed, an electrical particle pulse, said sensing zone having a dimension along the direction of movement of the particles such that the indefinite response regions at the beginning and end of said sensing zone are large compared to the definite response region in the center of said sensing zone, whereby said electrical particle pulses produced have no well-defined ends but have well-defined middle portions, first electrical circuit means for ascertaining two points on the waveform of each particle pulse in the middle portion of the waveform, said points being geometrically defined and spaced apart time-wise second electrical circuit means for measuring the duration of the segment of each particle pulse defined between said ascertainable points and for producing a duration-measuring pulse for each particle pulse, the duration of each duration-measuring pulse being that of said pulse segment and the amplitude thereof being the same for all duration-measuring pulses, and third electrical circuit means for averaging said duration-measuring pulses with respect to time to obtain a signal which is indicative of the concentration of particles in the fluid suspension.

11. The apparatus according to claim 10 wherein said first electrical circuit means is operable to ascertain two points having the same amplitude on the particle pulse waveform, one point being on the leading edge of the particle pulse waveform and one point being on the trailing edge of the particle pulse waveform.

12. The apparatus according to claim 10 wherein said two ascertainable points are at the same instantaneous amplitude value on the respective leading and trailing edges of each particle pulse, the value at each of the ascertainable points on each particle pulse waveform being a predetermined fractional value of the maximum amplitude of that pulse.

13. The apparatus according to claim 12 wherein said first electrical circuit means includes a delay circuit for delaying each particle pulse, a stretching circuit for stretching each pulse at the maximum amplitude of the pulse, an attenuating circuit for attenuating the stretched pulse to some fractional value of the maximum amplitude of the pulse, and circuit means for comparing the delayed pulse with the stretched and attenuated pulse and for generating a first signal when the instantaneous value of the leading edge of the delayed pulse exceeds the amplitude of the stretched and attenuated pulse and a second signal when the instantaneous value of the trailing edge of the delayed pulse falls below the amplitude of the stretched and attenuated pulse.

14. The apparatus according to claim 10 wherein said first electrical circuit means comprises circuit means for producing a stretched pulse, the waveform of said stretched pulse having a flat top, circuit means for adjusting the relative amplitudes of the particle pulse and the flat-topped stretched pulse so that the flat-topped stretched pulse amplitude is a predetermined fraction of the particle pulse, circuit means for adjusting the location in time of the flat-topped pulse relative to the particle pulse so that when the flat-topped pulse is compared with the particle pulse, either the leading edge or the trailing edge of the particle pulse waveform will intersect the flat-top of the waveform of the flat-topped pulse, and means for comparing the particle pulse and the flat-topped pulse to obtain an output signal for the period of time that the amplitude of the particle pulse exceeds the flat-topped pulse, one of the edges of said output signal occurring at the time of intersection and defining said one point.

15. The apparatus according to claim 14 wherein said first circuit means is operable to ascertain a point on the trailing edge of each particle pulse having an amplitude which is a predetermined fractional value of the maximum amplitude of the particle pulse.

16. The apparatus according to claim 14 wherein said first circuit means includes a differentiating circuit for differentiating each of said particle pulses to produce for each particle pulse a signal having a zero value at the time of occurrence of the peak of the particle pulse, circuit means for deriving a timing pulse at the time said signal has said zero value and for applying said timing pulse to said second electrical circuit means for causing said second electrical circuit means to generate one clearly defined edge of said duration-measuring pulse, the said one edge of said output signal being applied by circuit means to said second circuit means for causing said second circuit means to generate a clearly defined second edge of said duration-measuring pulse whereby said duration-measuring pulse has a clearly defined leading edge and a clearly defined trailing edge.

17. The apparatus according to claim 14 wherein said first circuit means is operable to locate said two points on said particle pulse waveform, and said circuit means for adjusting the location in time of the flat-topped pulse relative to the particle pulse is operable to adjust the last two mentioned pulses in such a way that both the leading and trailing edges of the particle pulse will intersect the flat-topped pulse, the two points of intersection defining both said two ascertainable points and respective clearly defined leading and trailing edges of the duration-measuring pulse.

18. The apparatus according to claim 10 wherein said third electrical circuit means includes circuit means for integrating said duration-measuring pulses with respect to time.

19. The apparatus according to claim 10 wherein said first circuit means is operable to ascertain for each particle pulse two points comprising a first point at the peak of the particle pulse and a second defined point on either the leading or trailing edge of the particle pulse.

20. The apparatus according to claim 19 wherein said first circuit means is operable to ascertain said defined point on the trailing edge of the particle pulse, said defined point being at an instantaneous value which is a predetermined fractional value of the maximum amplitude of the particle pulse.

21. The apparatus according to claim 20 wherein said first circuit means includes a differentiating circuit, a comparator and a pulse stretching and attenuating circuit, conductor means for applying each particle pulse simultaneously to said differentiating circuit, said comparator and said pulse stretching and attenuating circuit, said differentiating circuit being operable to ascertain the point of zero slope on the pulse waveform which point is at the peak of the pulse and for generating a signal at said point in time when the slope of the pulse waveform is zero, conductor means for applying said generated signal to said second circuit means, said stretching and attenuating circuit being operable to stretch the particle pulse at its maximum amplitude and to attenuate said stretched pulse, said comparator being operable to compare the stretched and attenuated pulse with the particle pulse applied directly to the comparator to ascertain when the instantaneous value of the trailing edge of the directly applied particle pulse falls below the amplitude of the stretched and attenuated pulse and for generating a signal at the point in time when the instantaneous value of the trailing edge of the particle pulse falls below the amplitude of the stretched and attenuated pulse, and conductor means for applying said second signal to said second circuit means.

22. The apparatus according to claim 10 wherein said first circuit means is operable to ascertain on each particle pulse waveform, two points comprising: a first point at the point of maximum slope on the leading edge of the particle pulse, and a second point at the point of maximum slope on the trailing edge of the particle pulse.

23. The apparatus according to claim 22 wherein said first circuit means includes differentiating circuit means for deriving the second derivative of the particle pulse and producing a signal having multiple zero crossing points, circuit means for deriving timing signals at the first and last zero crossing points of said signal, said first and last zero crossing points defining said two ascertainable points, and said second circuit means includes other circuit means associated therewith for enabling said second circuit means to generate a rectangular duration-measuring pulse in response to said timing signals for each particle pulse.

24. The apparatus according to claim 23 wherein said first circuit means includes a low threshold circuit, a differentiating circuit, conductor means for simultaneously applying each particle pulse to said low threshold circuit and to said differentiating circuit, said low threshold circuit being operable to produce a first signal having a constant given amplitude so long as the amplitude of the particle pulse is above a given threshold, said differentiating circuit being operable to produce a signal which is the second derivative of the particle pulse, a comparator for comparing the second derivative signal with a common potential and for generating positive and negative signals of given amplitude when the second derivative signal is positive or negative, circuit means for differentiating said signals of given amplitude to obtain positive and negative signal spikes when said signal changes polarity, conductor means for applying said first signal and said signal spikes to an AND circuit which passes only those signal spikes occurring during the time the amplitude of the particle pulse is above said given threshold, a full wave rectifier circuit for rectifying said signal spikes to obtain only positive spikes the first and last of which correspond to the respective points of maximum slope on the leading and trailing edges of the particle pulse, and said second circuit means includes conductor means for applying said first signal to a trailing edge detector circuit means for producing signal pulses when the amplitude of the particle pulse falls below said given threshold value and said first signal is terminated and goes to zero, conductor means for applying said positive spikes to a first signal generating circuit which is actuated by the first signal spike it receives, said signal generating circuit being operable to generate a first duration-measuring signal which has a constant amplitude, which is initiated by the first positive spike and which is not affected by succeeding positive spikes so long as the amplitude of the particle pulse is above said given threshold and said first signal generating circuit has not received a signal pulse from said trailing edge detector circuit means, an integrator for integrating said first duration-measuring signal, a first sample and hold circuit for holding the integral signal, conductor means for applying the positive spikes to said first sample and hold circuit which is operable to generate an output signal each time a positive spike is applied thereto, said output signal having an amplitude equal to the integral of the first duration-measuring signal which has been integrated up to that point in time, a second sample and hold circuit for holding said output signal, conductor means for applying a signal pulse from said trailing edge detector circuit means to said second sample and hold circuit for causing said output signal to be passed through said second sample and hold circuit to a comparator, conductor means for applying a signal pulse from said trailing edge detector circuit means to a second signal generating circuit to initiate a second duration-measuring signal having a constant amplitude, an integrator for integrating said second duration-measuring signal, a comparator for comparing the passed output signal with said developing integral signal up to the point in time where said developing integral signal equals the amplitude of said passed output signal, and said comparator being operable to generate a cancelling signal and to apply said cancelling signal to said second sample and hold circuit and said second signal generating circuit when said developing integral signal equals the amplitude of said passed output signal for terminating said second duration-measuring signal.

25. The apparatus according to claim 10 wherein said second electrical circuit means is operable to generate for each particle pulse a rectangular duration-measuring pulse having a given amplitude and a duration equal to the time period between said two ascertainable points.

26. The apparatus according to claim 10 wherein said particle analyzing device is a Coulter type particle analyzing device and said sensing zone includes a Coulter aperture.

* * * * *

Notice of Adverse Decision in Interference

In Interference No. 98,718 involving Patent No. 3,733,548, W. H. Coulter and W. R. Hogg, APPARATUS AND METHOD FOR MEASURING PARTICLE CONCENTRATION OF A SUSPENSION PASSING THROUGH A SENSING ZONE, final judgment adverse to the patentees was rendered Oct. 24, 1975, as to claims 1, 5, 6, 10, 18, 19, 20, 25 and 26.

[*Official Gazette February 10, 1976.*]

Disclaimer 3,733,548.—*Wallace H. Coulter*, Miami Springs, and *Walter R. Hogg*, Miami Lakes, Fla. APPARATUS AND METHOD FOR MEASURING PARTICLE CONCENTRATION OF A SUSPENSION PASSING THROUGH A SENSING ZONE. Patent dated May 15, 1973. Disclaimer filed Sept. 12, 1975, by the assignee, *Coulter Electronics, Inc.*

Hereby enters this disclaimer to claims 1, 5, 6, 10, 18, 19, 20, 25 and 26 of said patent.

[*Official Gazette March 30, 1976.*]